US011226633B2

(12) United States Patent
Kim et al.

(10) Patent No.: US 11,226,633 B2
(45) Date of Patent: Jan. 18, 2022

(54) MOBILE ROBOT AND METHOD OF CONTROLLING THE SAME

(71) Applicant: LG ELECTRONICS INC., Seoul (KR)

(72) Inventors: Junghwan Kim, Seoul (KR); Jaewon Kim, Seoul (KR); Hyunji Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 266 days.

(21) Appl. No.: 16/473,758

(22) PCT Filed: Dec. 26, 2017

(86) PCT No.: PCT/KR2017/015447
§ 371 (c)(1),
(2) Date: Jun. 26, 2019

(87) PCT Pub. No.: WO2018/124682
PCT Pub. Date: Jul. 5, 2018

(65) Prior Publication Data
US 2019/0332119 A1 Oct. 31, 2019

(30) Foreign Application Priority Data

Dec. 26, 2016 (KR) .................. 10-2016-0179205

(51) Int. Cl.
*G05D 1/02* (2020.01)
*A47L 11/40* (2006.01)
(Continued)

(52) U.S. Cl.
CPC ........ *G05D 1/0246* (2013.01); *A47L 11/4061* (2013.01); *G05D 1/0038* (2013.01);
(Continued)

(58) Field of Classification Search
CPC .............. A47L 2201/04; A47L 11/4061; B25J 11/0085; B25J 9/1666; B25J 19/023;
(Continued)

(56) References Cited

U.S. PATENT DOCUMENTS 6,535,793 B2 * 3/2003 Allard ................... B25J 9/1689
318/628
6,845,297 B2 * 1/2005 Allard ................... B25J 9/1689
318/628
(Continued)

FOREIGN PATENT DOCUMENTS

JP 2005-312893 11/2005
JP 2016-192040 11/2016
(Continued)

OTHER PUBLICATIONS

Park et al., Development of an image data acquisition system using a multi-function front camera for automotive applications, 2015, IEEE, p. (Year: 2015).*
(Continued)

Primary Examiner — McDieunel Marc
(74) Attorney, Agent, or Firm — KED & Associates, LLP

(57) ABSTRACT

A mobile robot includes: a sensor unit configured to sense an object present in a traveling direction; a camera configured to, in response to sensing of the obstacle by the sensor unit, photograph the obstacle; a data unit configured to store information regarding a plurality of obstacles; a controller configured to control an operation by recognizing the obstacle based on the information stored in the data unit; a travel unit configured to perform a designated operation according to a control command from the controller; and a speaker configured to output a designated sound according to a control command from the controller, wherein the controller comprises: an obstacle recognizer configured to analyze an image of the obstacle photographed by the (Continued)

camera, compare the image of the obstacle with data stored in the data unit, recognize the obstacle, and determine a type of the obstacle; and a motion controller configured to, in response to a type of the obstacle recognized by the obstacle recognizer, perform a designated operation according to setting stored in the data, and accordingly, it is possible to determine a type of an obstacle by recognizing the obstacle, effectively cope with obstacles by performing different operations according to types of the obstacles, improve cleaning efficiency, enable the mobile robot to recognize an obstacle and determine a type thereof within a short period of time, allow a user to modify an operation responsive to the type of the obstacle, and perform an operation suitable for characteristics of the obstacle, an area to be cleaned, or a surrounding environment.

29 Claims, 12 Drawing Sheets

(51) Int. Cl.
  *G05D 1/00* (2006.01)
  *G06K 9/00* (2006.01)

(52) U.S. Cl.
  CPC ...... *G06K 9/00805* (2013.01); *A47L 2201/04* (2013.01); *G05D 2201/0203* (2013.01); *G05D 2201/0215* (2013.01)

(58) Field of Classification Search
  CPC ........ B25J 9/0003; B25J 9/1697; B25J 5/007; B25J 19/02; B25J 9/1676; B25J 19/022; B25J 19/061; B25J 13/00; B25J 19/021; B25J 13/003; G05D 2201/0203; G05D 1/0246; G05D 1/0274; G05D 2201/0215; G05D 1/0248; G05D 1/0238; G05D 1/0231; G05D 1/0038; G01C 21/206; G01C 21/32; G01C 22/00; G06K 9/00805; G06N 3/08; Y10S 901/01; B60W 2420/42; B60W 2420/54; G06T 2207/30261; G06T 7/70; G08B 13/196; H04R 1/323; H04R 1/326
  See application file for complete search history.

(56) References Cited

U.S. PATENT DOCUMENTS

| | | | | |
|---|---|---|---|---|
| 7,430,455 | B2* | 9/2008 | Casey | G05D 1/0238 700/245 |
| 7,463,948 | B2* | 12/2008 | Orita | G05D 1/0251 700/245 |
| 7,539,557 | B2* | 5/2009 | Yamauchi | G05D 1/0038 340/12.54 |
| 7,599,758 | B2* | 10/2009 | Reindle | A47L 9/2821 15/3 |
| 2020/0341479 | A1* | 10/2020 | Kim | A47L 9/2894 |

FOREIGN PATENT DOCUMENTS

| KR | 10-2002-0080898 | 10/2002 |
|---|---|---|
| KR | 10-1049155 | 7/2011 |
| KR | 10-2012-0005890 | 1/2012 |

OTHER PUBLICATIONS

Jung et al., Mobile robot controlling using environment map and force feedback, 2007, IEEE, p. 1810-1815 (Year: 2007).*
Kayama et al., Mobile robot controlling using environment map, 2003, IEEE, p. 2463-2470 (Year: 2003).*
Silva et al., ERS-210 Mobile Video Surveillance System, 2005, IEEE, p. 262-265 (Year: 2005).*
Gräser, Technological Solutions to Autonomous Robot Control, 1998, Internet, p. 1-13 (Year: 1998).*
Martens et al., A Friend for Assisting Handicapped People, 2001, IEEE, p. 57-65 (Year: 2001).*
International Search Report dated Jun. 21, 2018 issued in Application No. PCT/KR2017/015447.

* cited by examiner

MOBILE ROBOT AND METHOD OF CONTROLLING THE SAME

CROSS-REFERENCE TO RELATED PATENT APPLICATIONS

This application is a U.S. National Stage Application under 35 U.S.C. § 371 of PCT Application No. PCT/KR2017/015447, filed Dec. 26, 2017, which claims priority to Korean Patent Application No. 10-2016-0179205, filed Dec. 26, 2016, whose entire disclosures are hereby incorporated by reference.

TECHNICAL FIELD

The present invention relates to a mobile robot and a method of controlling the same, and more particularly to a mobile robot capable of traveling while sensing an obstacle and a method of controlling the mobile robot.

BACKGROUND ART

A mobile robot is an apparatus capable of traveling in an area to be cleaned and performing cleaning by suctioning foreign substances such as dust from a floor.

The mobile robot is provided with a chargeable battery and capable of freely moving on its own using power of the battery, and performs cleaning by suctioning foreign substances present on a floor during traveling.

The moving robot performs an obstacle avoidance operation by sensing a distance to an obstacle, such as furniture, an office equipment, and a wall in the travel area, and controlling driving of a left wheel and a right wheel. The mobile robot is configured to return back to a charging station to charge the battery, when necessary.

When sensing an obstacle in a traveling path, t conventional mobile robot changes the traveling path to avoid the obstacle.

In addition, during cleaning, the mobile robot may approach the obstacle within a predetermined distance and then change the traveling path or may change the traveling path upon a collision with the obstacle. In the case of changing a path immediately upon sensing of an obstacle, it is not possible to clean a corresponding area, and therefore, changing the path is performed after approaching the obstacle as close as possible or after colliding the obstacle.

However, upon collision, obstacles may be damaged depending on types thereof, and certain obstacles have to be avoided before approach. In addition, there are some cases where obstacles move, so, if such obstacles are simply avoided, a cleaning operation cannot be completed, and an approach and then avoiding scheme may cause another problem, and therefore, it is not easy to address and cope with an obstacle simply by sensing the obstacle.

DISCLOSURE

Technical Problem

The present invention is to provide a mobile robot capable of operating differently during cleaning according to a sensed obstacle, and a method of controlling the same.

Technical Solution

A moving robot according to an embodiment of the present invention includes: a sensor unit configured to sense an object present in a traveling direction; a camera configured to, in response to sensing of the obstacle by the sensor unit, photograph the obstacle; a data unit configured to store information regarding a plurality of obstacles; a controller configured to control an operation by recognizing the obstacle based on the information stored in the data unit; a travel unit configured to perform a designated operation according to a control command from the controller; and a speaker configured to output a designated sound according to a control command from the controller, wherein the controller comprises: an obstacle recognizer configured to analyze an image of the obstacle photographed by the camera, compare the image of the obstacle with data stored in the data unit, recognize the obstacle, and determine a type of the obstacle; and a motion controller configured to, in response to a type of the obstacle recognized by the obstacle recognizer, perform a designated operation according to setting stored in the data.

The obstacle recognizer may be configured to analyze the image of the obstacle, determine a shape of the obstacle, compare the shape of the obstacle with pre-stored obstacle recognition data, recognize the shape of the obstacle, and determine the type of the obstacle, and configured to recognize the obstacle based on the image of the obstacle and a position and a motion of the obstacle sensed by the sensor unit.

The motion controller may be configured to, based on information on a motion set according to the type of the obstacle, perform a distinct operation according to the type of the recognized obstacle.

The obstacle recognizer may be configured to determine the type of the obstacle by categorizing the obstacle as a normal obstacle, a dangerous obstacle, a biological obstacle, or a floor obstacle.

The motion controller may be configured to control an operation according to a motion set responsive to the type of the obstacle and an individual motion set responsive to an individual obstacle included in the type of the obstacle.

The motion controller may be configured to, in response to the obstacle, perform a motion that constitutes a combination of at least one operation from among stopping, decelerating, accelerating, reversing, waiting, changing a traveling direction, and staying away from proximity, and may be configured to, in response to the obstacle, output any one of a sound effect, an alert sound, and a voice guidance through the speaker.

The controller may be configured to receive, from the terminal, information on an obstacle present in a travel area to be cleaned and motion information responsive to the obstacle, and store the received information, the obstacle recognizer may be configured to, based on the stored information on the obstacle present in the travel area, recognize a sensed obstacle, and the motion controller may be configured to control an operation according to the motion information that is set responsive to the obstacle.

The controller may be configured to, when no motion responsive to the recognized obstacle is set or when a new obstacle is sensed, request motion setting to the terminal.

The controller may be configured to, when the obstacle is unrecognizable or when a new obstacle is sensed, transmit obstacle information including the image of the obstacle to an external server, store obstacle data received from the server in the data unit, and re-recognize the obstacle.

A mobile robot system according to the present invention includes: a mobile robot configured to, in response to traveling in a set travel area, perform cleaning and perform a motion that is set responsive to a sensed obstacle; a terminal configured to transmit a cleaning command to the mobile robot and transmit information on an obstacle present in the travel area together with the cleaning command; and a server configured to collect and analyze information on an obstacle sensed by the mobile robot and generate obstacle recognition data including feature information for recognizing the obstacle, and motion information responsive to the obstacle.

The terminal may be configured to set any one motion responsive to the obstacle present in the travel area from among the motion information set by the server, and transmit the set motion to the mobile robot.

The terminal may be configured to, while the mobile performs the set motion, set a new motion responsive to the obstacle and transmit change data to the mobile robot, and the mobile robot may be configured to re-set a motion responsive to the obstacle based on the change data.

The terminal may be further configured to categorize the obstacle present in the travel area by type and set a motion responsive to the type of the obstacle or an individual obstacle included in the type of the obstacle.

The terminal may be further configured to set the mobile robot to, in response to the obstacle, perform a motion that constitutes a combination of at least one operation from among stopping, decelerating, accelerating, reversing, waiting, changing a traveling direction, and staying away from proximity, and may be configured to set the motion to, in response to the obstacle, output any one of a sound effect, an alert sound, and a voice guidance.

The server may be configured to collect collected information on the obstacle and data on the type of the obstacle set by the terminal and motion setting for the obstacle, calculate statistics, and update the obstacle recognition data and the motion information responsive to the obstacle according to frequency of sensing of the obstacle and frequency of motion setting for the obstacle.

The server may be configured to, when obstacle information on an unrecognizable obstacle or a new obstacle is received from the mobile robot, analyze the obstacle information, recognize the obstacle, and generate obstacle recognition data for the new obstacle and motion information responsive for the obstacle.

A method of controlling a mobile robot according to the present invention includes: while performing cleaning by traveling a designated travel area, sensing an obstacle; capturing an image of the obstacle; analyzing the image of the obstacle, determining a type of the obstacle, and recognizing a type of the obstacle; setting a designated motion responsive to the obstacle; and in response to the motion, outputting a motion constituting a combination of at least one operation or outputting a predetermined sound.

The motion constituting a combination of at least one operation from among stopping, decelerating, accelerating, reversing, waiting, changing a traveling direction, and staying away from proximity may be performed responsive to the obstacle, and any one sound among a sound effect, an alert sound, and a voice guidance may be output responsive to the obstacle.

The method may further include: before the performing of the cleaning, receiving a cleaning command for the travel area and data on an obstacle present in the travel area from the terminal; and, based on the data, setting a motion responsive to the obstacle present in the travel area.

Advantageous Effects

A mobile robot and a method of controlling the same according to the present invention may recognize an obstacle and determine a type thereof, perform a distinct operation according to the type of the obstacle, thereby enabled to respond to the obstacle effectively and improve cleaning efficiency.

The present invention may accumulate, store, and analyze information on an obstacle, thereby enabling the moving robot to recognize the obstacle and determine a type thereof within a short time.

In addition, the present invention may allow a user to modify an operation responsive to a type of an obstacle, thereby enabled to perform an operation suitable for a characteristic of the obstacle, an area to be cleaned, or a surrounding environment.

BEST MODE

Figure 1:
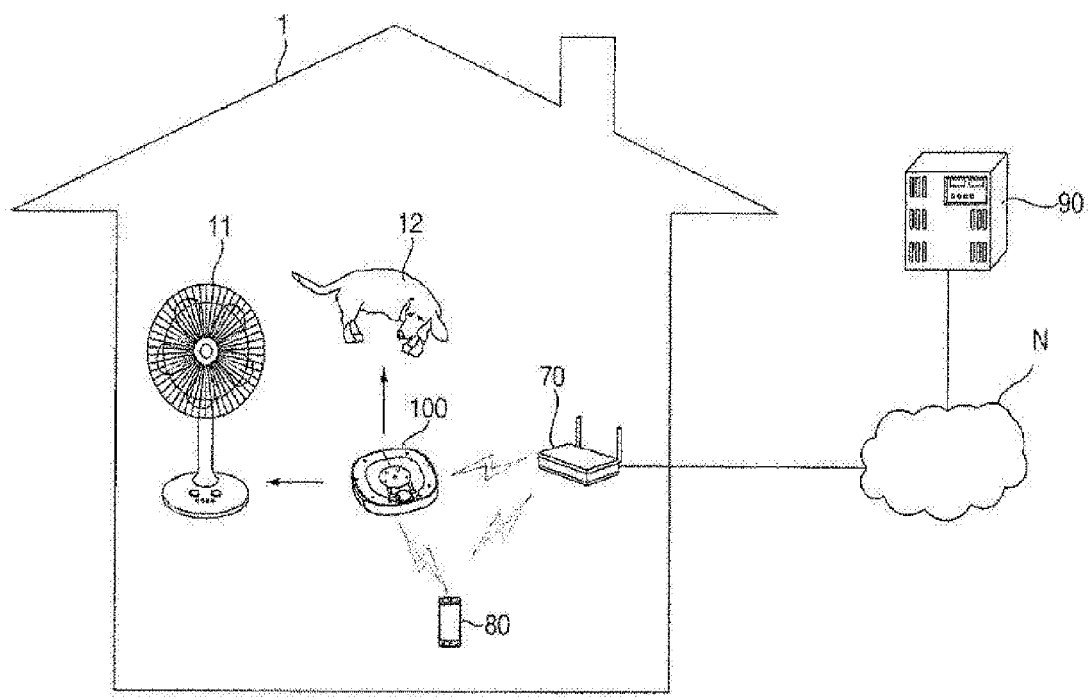
FIG. 1 is a diagram schematically illustrating a mobile robot and a system thereof according to an embodiment of the present invention.

Advantages and features of the present invention and a method of achieving the same will be clearly understood from embodiments described below in detail with reference to the accompanying drawings. However, the present invention is not limited to the following embodiments and may be implemented in various different forms. The embodiments are provided merely for complete disclosure of the present invention and to fully convey the scope of the invention to those of ordinary skill in the art to which the present invention pertains. The present invention is defined only by the scope of the claims. In the drawings, the thickness of layers and regions may be exaggerated for clarity. Throughout the drawings, like numbers refer to like elements.

Hereinafter, embodiments of the present invention will be described in detail with reference to the accompanying drawings.

FIG. 1 is a diagram schematically illustrating a mobile robot and a system thereof according to an embodiment of the present invention.

A mobile robot system includes a mobile robot 100, a terminal 80, and a server 90.

The mobile robot 100 performs cleaning by suctioning dirt while traveling in a set region within an interior space 1. The mobile robot 100 includes a battery (not shown), and performs cleaning while traveling based on operation power supplied from the battery. A charging station (not shown) for charging the battery of the mobile robot is further included.

The mobile robot 100 may recognize a plurality of obstacles 11 and 12 present in the interior space 1 by sensing the same, and may avoid an obstacle according to a type of the obstacle or may approach an obstacle and then perform a predetermined operation.

The mobile robot 100 may receive setting data for the interior space 1 through communication with the terminal 80, receive a cleaning command for a predetermined cleaning region within the interior space 1, and perform cleaning in accordance with the cleaning command.

Upon sensing of an obstacle, the mobile robot 100 transmits obstacle information to the server 90 and set a default operation in response to the obstacle based on data received from the server 90.

In addition, the mobile robot 100 may provide information on a sensed obstacle to the terminal, and perform a specific operation in response to the obstacle based on data received from the terminal 80.

The terminal 80 may include an application for controlling the mobile robot 100, execute the application to display a map of a travel area to be cleaned by the mobile robot, and designate a specific region on the map to clean. The terminal may be, for example, a remote control, a PDA, a laptop, a tablet PC, a smart phone, or the like in which an application for setting a map is installed.

The terminal 80 may execute the application to set information on an obstacle present in the interior space 1 and an operation responsive to the obstacle. In this case, when executing the application, the terminal 80 may access the server 90 via a network and receive obstacle information and operation information responsive an obstacle from the server.

In addition, the terminal 80 may change an operation of the mobile robot 100 based on obstacle information received from the mobile robot 100.

The server 90 accumulates and stores obstacle information and analyzes the obstacle information to thereby recognize a type of an obstacle. In addition, the server 90 may classify an obstacle by type and set an operation of the mobile robot 100 responsive to the obstacle.

The server 90 analyzes new obstacle information to thereby update pre-stored obstacle information. In addition, the server 90 receives and stores operation information of the mobile robot responsive to an obstacle set or changed by the terminal 80, and updates setting of an operation of the mobile robot responsive to the obstacle by matching the received operation information with the pre-stored obstacle information.

Upon an access of the terminal 80, the server 90 provides obstacle setting of the interior space 1 and data on operations of the mobile robot 100 to the terminal 80 based on pre-stored data.

In addition, the server 90 analyzes obstacle information received from the mobile robot 100 to thereby determine a type of an obstacle based on pre-stored data and transmit a result of the determination to the mobile robot 100.

The mobile robot 100 is connected to a communication device 70 to communicate with the server 90 via a network N.

In addition, the mobile robot 100 may be connected with the terminal 80 via Wi-Fi and may communicate with the terminal 80 through short-ranged wireless communication such as Bluetooth or the like.

The communication device 70 includes a protocol for access to the network N, and transmits and receives data of the mobile robot. As the communication device 70, a router or a gateway may be used. The network N is basically the Internet network. In some cases, the network N may be a small-sized network based on a mobile robot or a home appliance or a local area network for a predetermined area.

Figure 2:
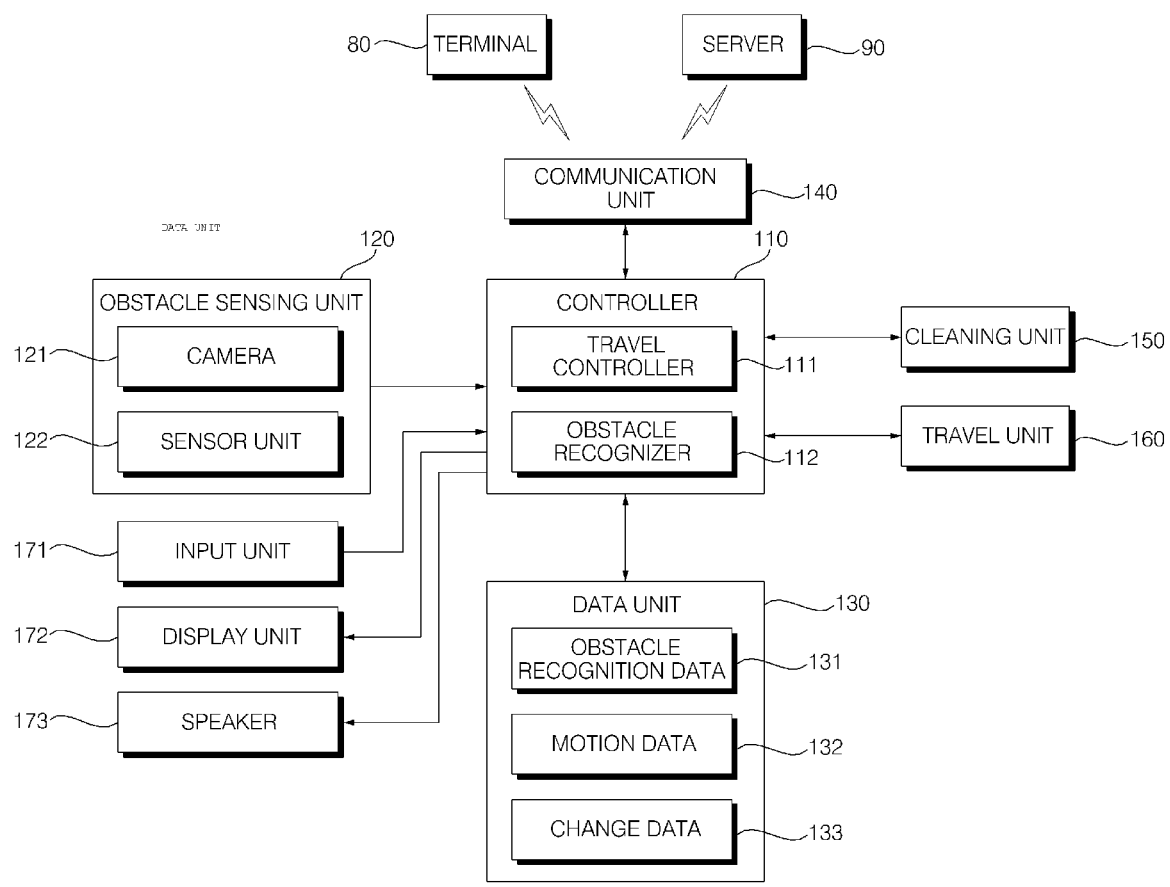
FIG. 2 is a block diagram schematically illustrating configuration of a mobile robot according to an embodiment of the present invention.

FIG. 2 is a block diagram schematically illustrating configuration of a mobile robot according to an embodiment of the present invention.

As illustrated in FIG. 2, a mobile robot 100 includes a communication unit 140, an obstacle sensing unit 120, a cleaning unit 150, a travel unit 160, a data unit, and a controller 110 for controlling overall operations.

In addition, the mobile robot 100 further includes an input unit 171 for On/Off inputs or any other various inputs, a display unit 172 for displaying an operating status or an operation mode of the mobile robot 100, and a speaker 173 for outputting a predetermined alert sound or sound effect.

The input unit 171 includes at least one button, switch, or touch input means to receive various control commands necessary for overall operations of the mobile robot 100 and input the received control commands to the controller 110.

The display unit 172 includes a display such as an LED and an LCD to display an operation mode, reservation information, a battery status, an operating status, an error status, and the like of the mobile robot 100.

The speaker 173 outputs a predetermined effect sound, alert sound, or voice guidance corresponding to an operation mode, reservation information, a battery status, an operating status, or an error status.

The travel unit 160 includes at least one drive wheel (not shown) for moving a main body of the mobile robot, and a drive motor (not shown) connected to the drive wheel to rotate the drive wheel. Drive wheels may be provided on the left and right side of the main body, and such wheels will be hereinafter referred to as a left wheel and a right wheel. The left wheel and the right wheel may be driven by one drive motor, and, when necessary, there may be a left-wheel drive motor for driving the left wheel and a right-wheel drive motor for driving the right wheel may be provided. A traveling direction of the main body may be changed to the left or to the right by differentiating speed of rotation between the left wheel and the right wheel.

The cleaning unit 150 may include a suction hole (not shown) formed at the bottom of the main body of the mobile robot and configured to suction air, a suction device (not shown) providing a suction force to suction air through the suction hole, a brush, and a dust container (not shown) for collecting dust suctioned together with air through the suction hole.

The cleaning unit 150 may include a roll-type main brush (not shown) having bristles exposed through the suction hole, and an auxiliary brush (not shown) disposed at the front of the bottom surface of the main body and having bristles composed of a plurality of radially extending wings. Dust is separated from a floor in a travel area by rotation of the brushes, and the dust separated from the floor is suctioned through the suction hole and then collected in the dust container.

In addition, the cleaning unit 150 may further include a wet-mop cleaning unit (not shown) installed at the rear of the bottom surface of the main body to wet mop a floor while in contact with the floor, and a water container (not shown) for supplying water to the wet-mop cleaning unit.

A battery (not shown) supplies power not just for a drive motor but also for overall operations of the moving robot 100. If the battery is run out, the moving robot 100 may travel to return back to a charging station for a charging purpose. While returning back, the moving robot 100 may detect a position of the charging station on its own. The charging station may include a signal transmitter (not shown) that transmits a predetermined return signal. The return signal may be an ultrasonic signal or an infrared signal, but aspects of the present invention are not necessarily limited thereto.

The obstacle sensing unit 120 includes a camera 121 for photographing a travel area, and a sensor unit 122 for sensing an obstacle.

When an obstacle present in a traveling direction is sensed by the sensor unit 122, the obstacle sensing unit 120 operates the camera to photograph the obstacle by operating the camera 121. The obstacle sensing unit 120 inputs image data of the photographed obstacle and position or movement information of the obstacle, sensed by the sensor unit 122, to the controller 110.

The camera 121 may include at least one optical lens, an image sensor including a plurality of photodiodes (e.g., pixels) to form an image by light passing through an optical lens, and a Digital Signal Processor (DSP) which constructs an image based on signals output from the photodiodes. The DSP is capable of generating not just a still image, but also a video composed of frames which constitute still images.

The camera 121 may be provided in an upper surface or a front surface of the mobile robot 100 to acquire an image in the traveling direction. Preferably, the camera 121 photographs an area in the forward traveling direction of the mobile robot 100 up to a predetermined height from the floor. The camera 121 may photograph an area including the floor in front to the ceiling, depending on a field of view of a lens. In addition, the obstacle sensing unit 120 may further include a lower camera for acquiring an image of the floor.

A type, a position, a photographing range of the camera 121 are not necessarily limited thereto.

The sensor unit 122 is comprised of a plurality of sensors for sensing an obstacle in front. The sensor unit 122 may be at least one of an ultrasonic sensor for sensing an obstacle in front or on the left or right side, an infrared sensor, a laser sensor, or a 3D sensor for outputting an optical pattern. In addition, the sensor unit 122 may further include a cliff sensor for sensing the presence of a cliff on a floor in a travel area.

The data unit 130 records a variety of information necessary to control the mobile robot 100 and may include a volatile or non-volatile recording medium. The recording medium stores data readable by a micro-processor, and the recording medium may include a Hard Disk Drive (HDD), a Solid State Disk (SSD), a Silicon Disk Drive (SDD), a ROM, a RAM, a CD-ROM, a magnetic tape, a floppy disk, an optical data storage device, etc.

The data unit 130 stores obstacle recognition data 131 including feature information necessary to recognize obstacles, motion data 132 set to perform a predetermined operation according to an obstacle type, and change data 133 received from the terminal in response to change of an operation. In addition, the data unit 130 stores a map for a travel area.

The obstacle recognition data 131 includes image data for an obstacle captured by the camera 121, and recognition information received from the server to recognize an obstacle. The motion data 132 includes motion information, which is about an operation of the mobile robot responsive to a recognized obstacle, for example, motion information such as a traveling speed, a traveling direction, whether to avoid the obstacle, whether to stop traveling, etc., and data on a sound effect, an alert sound, or a voice guidance output through the speaker 173.

The communication unit 140 includes a plurality of communication modules to transmit and receive data to and from the server 90 through the communication device 70 and communicate with the terminal 80.

The communication unit 140 transmits information on an obstacle sensed by the obstacle sensing unit 120 to the server 90 through the communication unit 140, and receives data on the obstacle from the server. In addition, the communication unit 140 receives, from the terminal 80, information on an obstacle present in a travel area and operation information dependent thereon, and transmits operation data of the mobile robot to the terminal 80.

The controller 110 controls the travel unit 160 so that the mobile robot travels within a travel area in the interior space 1, which is designated to clean.

During traveling, the controller 110 controls the travel unit 160 and the cleaning unit 170 to suction dirt or foreign substances in the surroundings of the mobile robot to thereby perform cleaning of the travel area. Accordingly, the cleaning unit 150 operates the brush to make the dirt or the foreign substances easy to be suctioned, and operates the suction device to suction the dirt or the foreign substances.

The controller 110 checks a remaining capacity of the battery to determine when to return to the charging station. When the remaining capacity of the battery reaches to a predetermined value, the controller 110 stops an operation in process and starts to search for the charging station to return back to the charging station. The controller 110 may output a notification about the remaining capacity of the battery and a notification about the return to the charging station.

The controller 110 controls to process data input by manipulation of the input unit 171, to set an operation mode of the mobile robot, to output an operating status through the display unit 172, and to output an alert sound, a sound effect, or a voice guidance through the speaker 173 according to the operating status, an error status, or sensing of an obstacle.

In addition, the controller 110 controls to recognize an obstacle sensed by the obstacle sensing unit 120 and perform a predetermined operation responsive to the obstacle. In this case, when it is not possible to recognize the obstacle, the controller 110 transmits obstacle information to the server 90 through the communication unit 140 and, upon receiving data on the obstacle, performs the predetermined operation.

The controller 110 may recognize an obstacle based on setting data for a travel area, which is received from the terminal 80. Based on the setting data received from the terminal 80, the controller 110 performs a specific operation designated by the terminal in response to the recognized obstacle.

The controller 110 includes an obstacle recognizer 112 for recognizing an obstacle sensed by the obstacle sensing unit 120, and a motion controller 111.

The obstacle recognizer 112 analyzes obstacle information input from the obstacle sensing unit 120 to thereby recognize an obstacle based on obstacle recognition data of the data unit and determine a type of the obstacle.

Based on data input from the sensor unit 122, the obstacle recognizer 112 determines presence and a position of an obstacle and senses a motion of the obstacle.

In addition, the obstacle recognizer 112 analyzes image data of an obstacle captured by the camera 121 to thereby determine a type of the obstacle. The obstacle recognizer 112 analyzes the image data to thereby extract a contour of the obstacle, recognize the obstacle based on a shape of the obstacle, and determine a type of the obstacle. In addition, based on the shape of the obstacle, the obstacle recognizer 112 may determine the type of the obstacle according to a color and a size of the obstacle. In addition, the obstacle recognizer 112 may determine the type of the obstacle based on the shape and a motion of the obstacle.

The obstacle recognizer 112 identifies a human, an animal, and an object based on obstacle information. The obstacle recognizer 112 categorizes obstacle types into a normal obstacle, a dangerous obstacle, a biological obstacle, and a floor obstacle, and determine a particular individual obstacle in each category.

When an obstacle is not possible to be recognized or is a new obstacle, the obstacle recognizer 112 stores image data for the corresponding obstacle or data on a motion of the corresponding obstacle as obstacle information and transmits the obstacle information to the server 90 through the communication unit 140. The obstacle recognizer 112 stores obstacle data received from the server in the data unit and recognizes an obstacle based on the obstacle data.

When an obstacle is recognized and a type thereof is determined, the motion controller 111 retrieves motion information corresponding to the obstacle from the motion data 132 and controls the travel unit 160 to perform an operation designated in response to the obstacle. When it comes to performing the designated motion, the motion controller 111 not just controls traveling but also outputs a predetermined sound effect, an alert sound, or a voice guidance through the speaker 173.

For example, the motion controller 111 performs a control based on motion information set responsive to an obstacle, so that the mobile robot 100 stops, decelerates, accelerate, reverses, makes U-turn, changes a traveling direction, stays away a predetermined distance from the obstacle, and waits for a predetermined time. In addition, the motion controller 111 is able to output a sound designated for an obstacle through a speaker in such a way that the sound is output along with a designated motion.

When change data is received from the terminal 80, the motion controller 111 changes a motion responsive to a recognized obstacle based on the change data and performs the changed motion.

When cleaning of a set travel area is complete, the controller 110 stores a cleaning record in the data unit 130.

The controller 110 stores information on an obstacle sensed during traveling in the travel area and motion information responsive to the obstacle, and, in the case of cleaning of the travel area again, cleans the travel area using stored data, that is, the obstacle information and the motion information.

Figure 3:
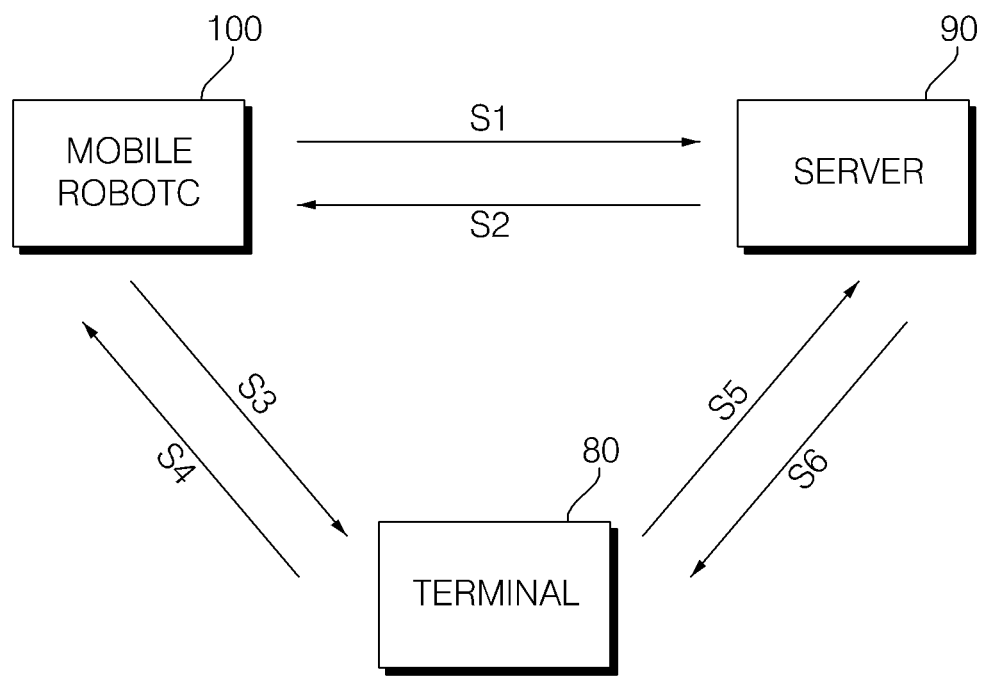
FIG. 3 is a diagram referred to in the description about a data flow among a mobile robot, a server, and a terminal according to an embodiment of the present invention.

FIG. 3 is a diagram referred to in the description about a data flow among a mobile robot, a server, and a terminal according to an embodiment of the present invention.

As illustrated in FIG. 3, the mobile robot 100, the server 90, and the terminal 80 communicate with one another.

When an obstacle is sensed by the obstacle sensing unit during cleaning, the mobile robot 100 captures the obstacle using the camera and then recognizes the obstacle.

The mobile robot 100 recognizes an obstacle based on stored data, and, when the obstacle is not recognizable or is a new obstacle, transmits obstacle information to the server 90 (S1).

The server 90 analyzes obstacle information received from the mobile robot to thereby determine a type of the obstacle and generate obstacle recognition data including feature information necessary to recognize the obstacle. In addition, the server 90 generates motion information setting an operation responsive to the obstacle, stores the motion information, and transmits the motion information to the mobile robot 100 (S2).

The mobile robot 100 stores received data on an obstacle as obstacle recognition data and motion data, and, in the case of sensing the same obstacle again, recognizes the obstacle based on the stored data.

In response to the recognized obstacle, the mobile robot 100 performs a designated motion based on the motion data. Depending on the obstacle, the mobile robot 100 may perform a traveling-related operation and output a predetermined sound.

The terminal 80 executes an application to receive obstacle data from the server 90 and stores the obstacle data, and inputs a command so that the mobile robot 100 cleans a specific travel area in the interior space based on the obstacle data.

The terminal 80 designates an obstacle present in the travel area and a motion responsive to the obstacle, and transmits obstacle setting data to the mobile robot 100 (S4).

In this case, the terminal 80 inputs setting of the travel area based on obstacle data (S6) on an obstacle and a motion, the data which is previously stored or received from the server 90. The terminal 80 periodically accesses the server 90 (S5) to thereby receive the data on the obstacle and the motion (S6) and update data stored therein.

The mobile robot 100 performs cleaning of the travel area based on a cleaning command and obstacle setting data, which are received from the terminal 80. During the cleaning, the mobile robot 100 transmits data on an operation mode, an operating status, an error status, and the like to the terminal 80 (S3).

While the moving robot 100 performs cleaning, the terminal 80 may change a motion of the mobile robot 100 responsive to the obstacle. The terminal 80 change a motion responsive to a type of the obstacle, and transmits data on the changed motion to the mobile robot 100. When change data is received from the terminal, the mobile robot 100 stores the change data, updates motion data responsive to the obstacle according to the received change data, and performs the changed motion.

When the cleaning is complete, the mobile robot 100 stores a cleaning record, stores information on an obstacle sensed during the cleaning, motion information dependent thereon, and information changed by the terminal, and transmits the stored information to the server 90.

The server 90 analyzes the changed data to thereby update pre-stored data.

Figure 4:
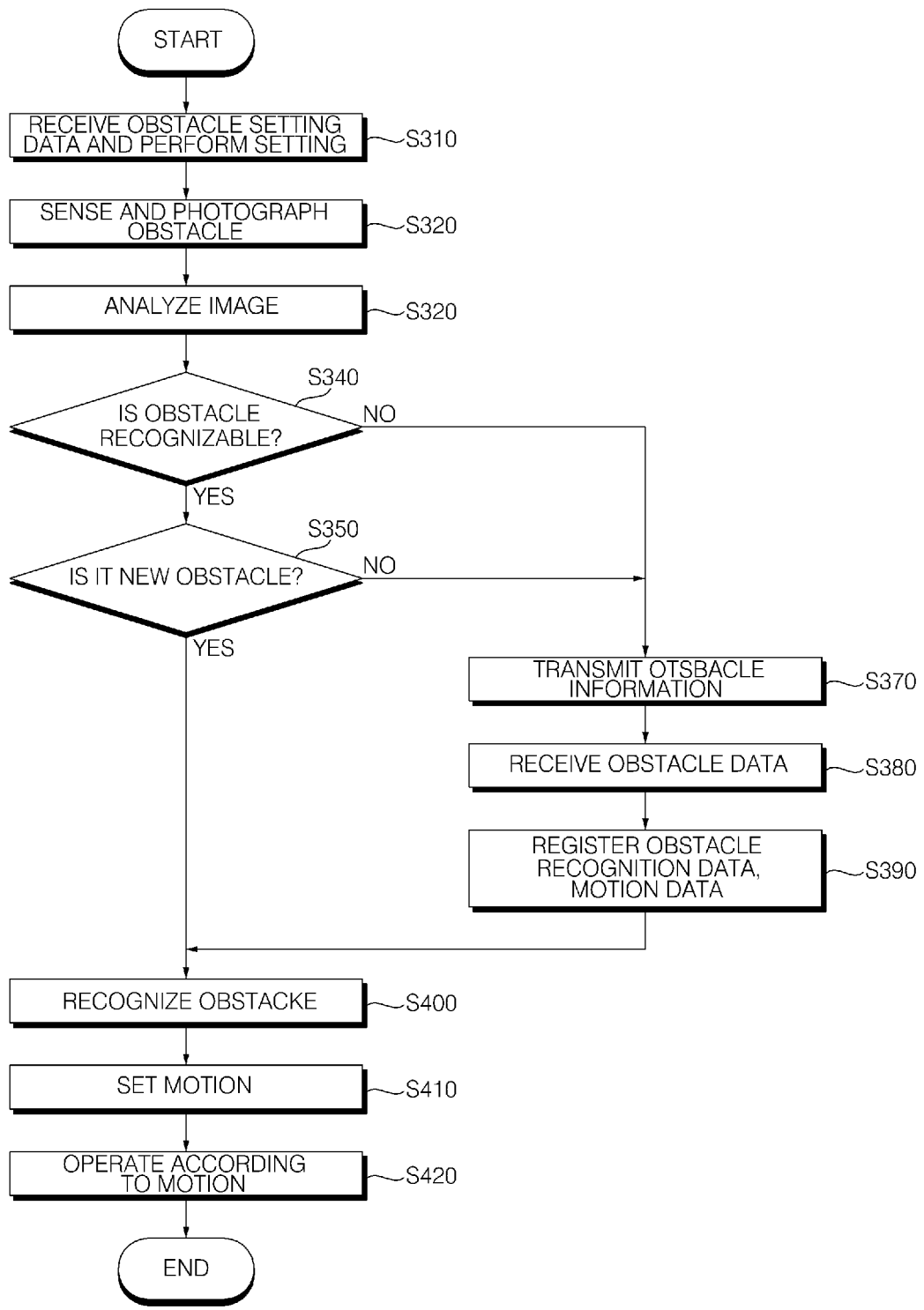
FIG. 4 is a flowchart illustrating a method for recognizing an obstacle by a mobile robot and controlling the mobile robot according to an embodiment of the present invention.

FIG. 4 is a flowchart illustrating a method for recognizing an obstacle by a mobile robot and controlling the mobile robot according to an embodiment of the present invention.

As illustrated in FIG. 4, the mobile robot 100 receives obstacle setting data together with a cleaning command from the terminal 80, and set a cleaning mode for a travel area in the interior space based on the obstacle setting data (S310).

The mobile robot 100 performs cleaning while traveling in the set travel area.

When a cleaning command is input without setting of a travel area and obstacle setting data, the mobile robot 100 starts cleaning with reference to the current position.

When an obstacle is sensed by the sensor unit 122 during the cleaning, the obstacle recognizer 112 of the mobile robot 100 operates the camera 121 to thereby capture the obstacle (S320).

The obstacle recognizer 112 analyzes image data for the obstacle captured by the camera 121 (S330) to thereby recognize the obstacle.

The obstacle recognizer 112 determines whether the obstacle is possible to be recognized based on the image data for the obstacle (S340).

When the obstacle is possible to be recognized, the obstacle recognizer 112 determines whether the obstacle is a new obstacle (S350).

When the obstacle is possible to be recognized and is not a new obstacle, the controller 110 retrieves shape information of the obstacle from the obstacle recognition data 131 to thereby recognize the obstacle (S400) and determine a type of the obstacle.

The motion controller 111 sets a motion responsive to a type of an obstacle determined based motion data, and controls the travel unit 160 or the speaker 173 to perform the set motion. When no motion responsive to the obstacle is set, the motion controller 111 performs a default motion responsive to the recognized obstacle.

Accordingly, the mobile robot 100 may perform a predetermined operation or output a predetermined sound in response to the recognized obstacle.

Meanwhile, when the obstacle is not possible to be recognized or when the obstacle is possible to be recognized but is a new obstacle, the obstacle recognizer 112 transmits obstacle information to the server 90 through the communication unit 140.

In this case, the server 90 analyzes the received obstacle information to thereby compare the obstacle information with pre-stored data, and searches for the new obstacle to thereby recognize the obstacle and determine a type of the obstacle. As for the new obstacle, the server 90 may set motion information responsive to the new obstacle. In this case, the server 90 may set a plurality of motions responsive to the obstacle.

In addition, when a sensed obstacle is a pre-registered obstacle or is not possible to be recognized, the server 90 may analyze image data for the sensed obstacle to thereby extract a shape of the image data, compare the shape with pre-stored data, and determine a type of the obstacle.

Since the same obstacle can be recognized differently or cannot be recognized according to a shape of image data, the server 90 adds recognition information for the corresponding obstacle.

The server 90 stores obstacle recognition data or motion information responsive to a new obstacle in a database, and transmits the obstacle information or the motion information to the mobile robot 100. Upon an access of the terminal 80, new data is transmitted to the terminal to thereby update information regarding the new obstacle.

When the obstacle recognition data or the motion information is received from the server 90, the controller 110 of the mobile robot 100 registers and stores the received data in the data unit 130 (S390).

The obstacle recognizer 112 recognize a new obstacle or an unrecognizable obstacle based on the received data, (S400), and determines a type of a corresponding obstacle.

The motion controller 111 sets a motion corresponding to a type of an obstacle, which is determined based on motion data, and controls the travel unit 160 or the speaker 173 to perform the set motion.

Meanwhile, when no motion responsive to a type of an obstacle is set, the motion controller 111 performs a default motion. In addition, the motion controller 111 may request motion setting to the terminal 80. When a motion is set by the terminal within a predetermined time, the motion controller 111 performs the set motion, and, upon elapse of the time, performs the default motion. For example, the default motion may be set to Approach And Avoid or Change Path. Alternatively, when there is a plurality of motions responsive to the obstacle, one of the plurality of motions may be set as the default motion.

The mobile robot 100 performs a predetermined operation or outputs a predetermines sound in response to a recognized obstacle.

Figure 5:
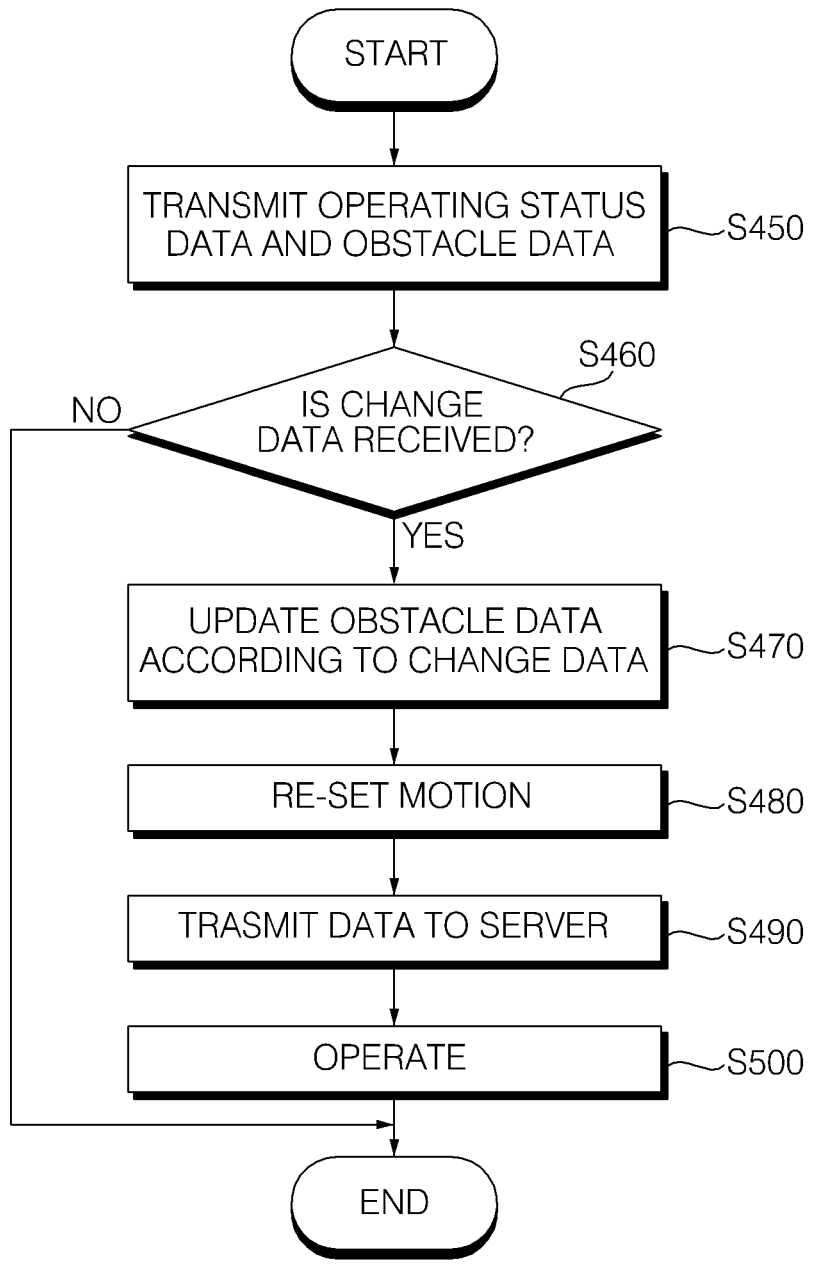
FIG. 5 is a flowchart illustrating a method of controlling a mobile robot in response to change of obstacle data according to an embodiment of the present invention.

FIG. 5 is a flowchart illustrating a method of controlling a mobile robot in response to change of obstacle data according to an embodiment of the present invention.

As illustrated in FIG. 5, while performing cleaning set for a travel area, the mobile robot 100 transmits data on an operating status or data for requesting motion setting responsive to an obstacle to the terminal 80 at a predetermined time interval as obstacle data (S450).

When an obstacle not included in initial obstacle setting data is sensed and when an obstacle with no motion set thereto is sensed, the mobile robot may transmit obstacle data to the terminal 80 to request motion setting. In addition, when a new obstacle which has not been registered is sensed, the mobile robot 100 may request that the terminal set a motion responsive to the new obstacle based on obstacle data received from the server.

While performing cleaning, the mobile robot 100 receives, from the terminal 80, change data that includes information on a motion being performed responsive to the obstacle (S460).

The controller 110 stores the received change data in the data unit 130, and updates obstacle data including obstacle recognition data and motion data by changing information on an obstacle present in a travel area or the information on the motion responsive to the obstacle (S470). For example, in the case where a motion A is set to change a traveling path in response to sensing of a pet, if change data is received, the motion A may be changed to a motion B based on the change data in such a way to approach and then wait in response to sensing of a pet. In addition, the setting may be changed based on the change data in such a way to output a predetermined sound while performing an existing motion. Furthermore, the change data may add a new motion C responsive to a pet.

The controller 110 resets a motion responsive to a sensed obstacle based on the change data (S480), and transmits data on changed motion information to the server 90 (S490).

The server 90 updates motion information responsive to a corresponding obstacle based on received data. For example, in the case where motion information is set in such a way to set any one of the motions A and B in response to a pet, the setting may be changed to performing the motion A while performing the motion B as a default motion. In addition, in the case where a new motion C responsive to a pet is added by the terminal, the server 90 may add corresponding motion information.

The server 90 may store motion information changed through the terminal, calculate statistics on accumulated data, and set a default motion responsive to a specific obstacle. That is, if a motion B is selected by the terminal from motions A and B responsive to a pet or if a percentage to change the motion A to the motion B during cleaning increases to a predetermined value or higher, a default motion responsive to an obstacle may be set to the motion B. In addition, if a motion C is not selected from among motions A, B, and C responsive to an obstacle, the motion C may be excluded from motions responsive to the corresponding obstacle.

If an obstacle is sensed by the sensor unit 122 during cleaning after change of obstacle data, the obstacle sensing unit 120 of the mobile robot 100 operates the camera 121 to photograph the obstacle and the obstacle recognizer 112 recognizes the obstacle. The motion controller 111 controls the mobile robot to operate according to a reset motion.

Accordingly, the mobile robot 100 performs an operation set according to the changed motion information (S500).

Figure 6:
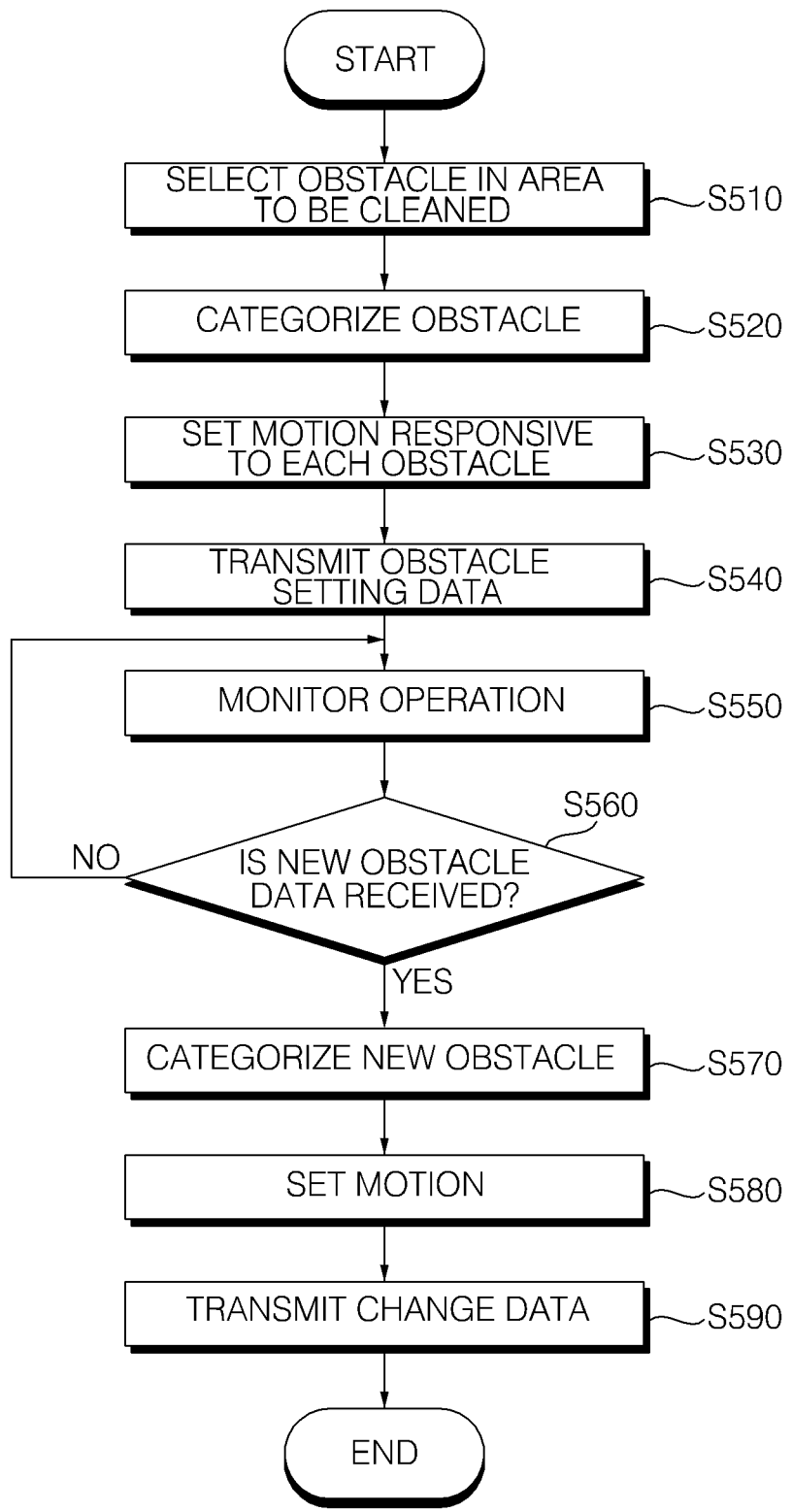
FIG. 6 is a flowchart illustrating a method of controlling a terminal that changes operation of a mobile robot according to an embodiment of the present invention.

FIG. 6 is a flowchart illustrating a method of controlling a terminal that changes operation of a mobile robot according to an embodiment of the present invention.

As illustrated in FIG. 6, the terminal 80 executes an application, provided therein, to transmit a cleaning command to the mobile robot 100.

The terminal 80 may set a travel area using a control menu and set a type of an obstacle present in the travel area. For example, if a living room is set as a travel area, the terminal 80 may select a sofa, a table, a pet, and a vase as obstacles through the control menu.

The terminal 80 categorizes an obstacle selected through the control screen (S520), and sets a motion responsive to the obstacle (S530). The terminal 80 displays a list of multiple selectable motions responsive to the obstacle selected through the control screen, and sets a to-be-performed motion according to a user's input.

The terminal 80 transmits, to the mobile robot 100, obstacle setting data including information on a travel area, information on an obstacle included in the travel area, and information on a motion to be perform responsive to each obstacle (S540).

Accordingly, the mobile robot 100 performs cleaning of the travel area.

The terminal 80 receives data on an operating status from the mobile robot 100 at a predetermined time interval, and outputs the operating status on a screen to thereby monitor the operation of the mobile robot 100 (S550).

In this case, when a new obstacle not included in obstacle setting data is sensed, the mobile robot 100 may transmit data on the new obstacle to the terminal.

That is, the mobile robot 100 transmits data on an obstacle possible to be recognized but not included in obstacle setting data or an obstacle having no motion set therefor to the terminal 80 to request motion setting.

When data on a new obstacle is received from the mobile robot 100, the terminal 80 categorizes the new obstacle (S570) and sets a motion responsive to the new obstacle (S580). When the new obstacle is an unregistered obstacle, the mobile robot 100 registers obstacle information and set a motion responsive to the obstacle. In addition, when an obstacle is registered but no motion responsive to the obstacle is set, a motion responsive to the obstacle is set.

The terminal 80 transmits motion information responsive to the new obstacle as change data to the mobile robot 100 (S590).

The mobile robot 100 stores the change data, resets the motion based on the change data, and operates according to the motion.

Figure 7:
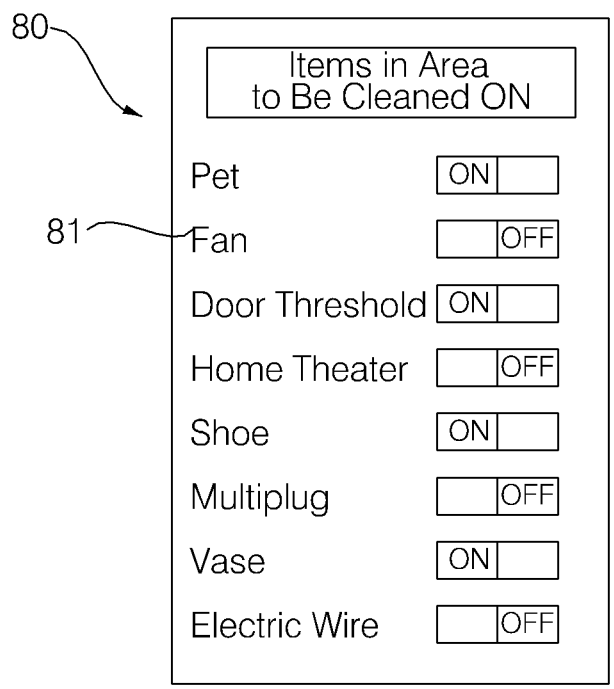
FIG. 7 is a diagram illustrating a control screen of a terminal to input a setting for obstacle recognition by a mobile robot according to an embodiment of the present invention.

FIG. 7 is a diagram illustrating a control screen of a terminal to input a setting for obstacle recognition by a mobile robot according to an embodiment of the present invention.

As shown in FIG. 7, the terminal 80 outputs a control screen 81 including an obstacle selection menu so as to set an obstacle present in an area to be cleaned.

Figure 8:
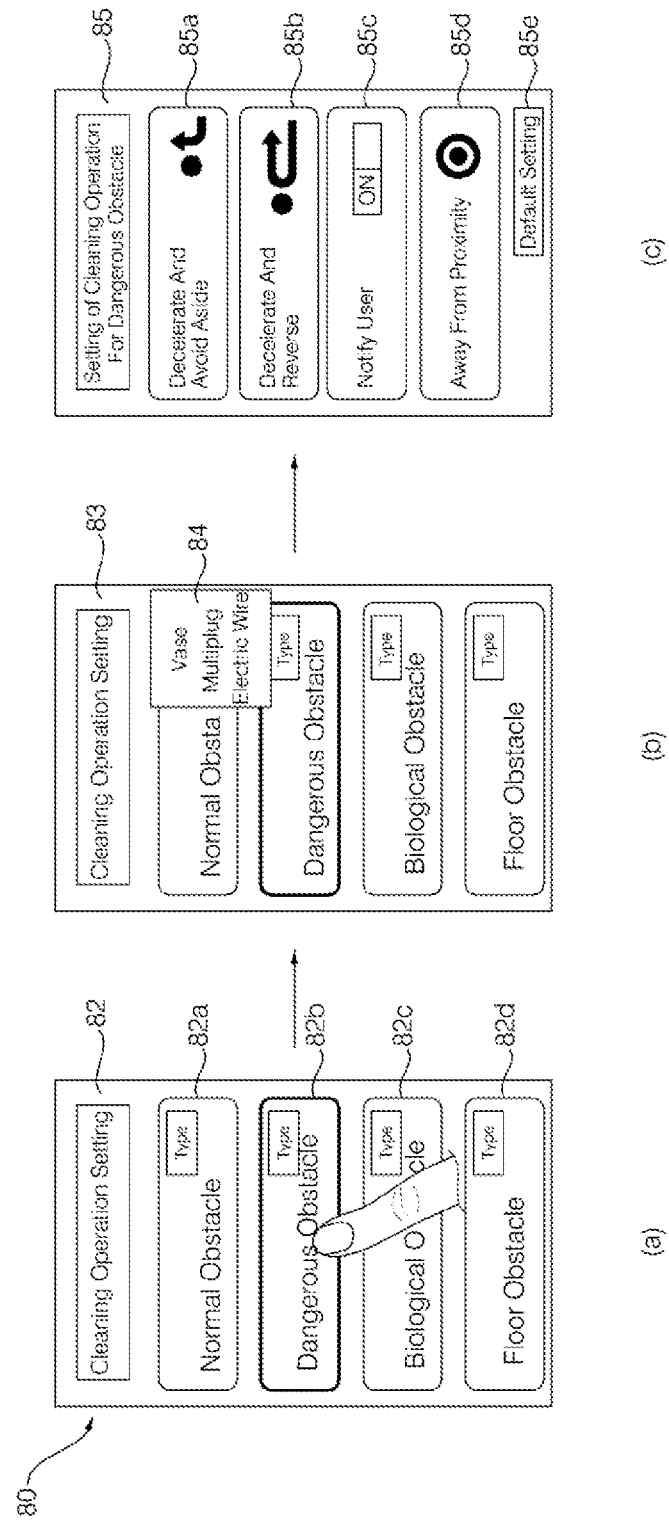
FIG. 8 is a diagram illustrating a control screen for setting a mobile robot's operation responsive to a dangerous obstacle according to an embodiment of the present invention.
Figure 9:
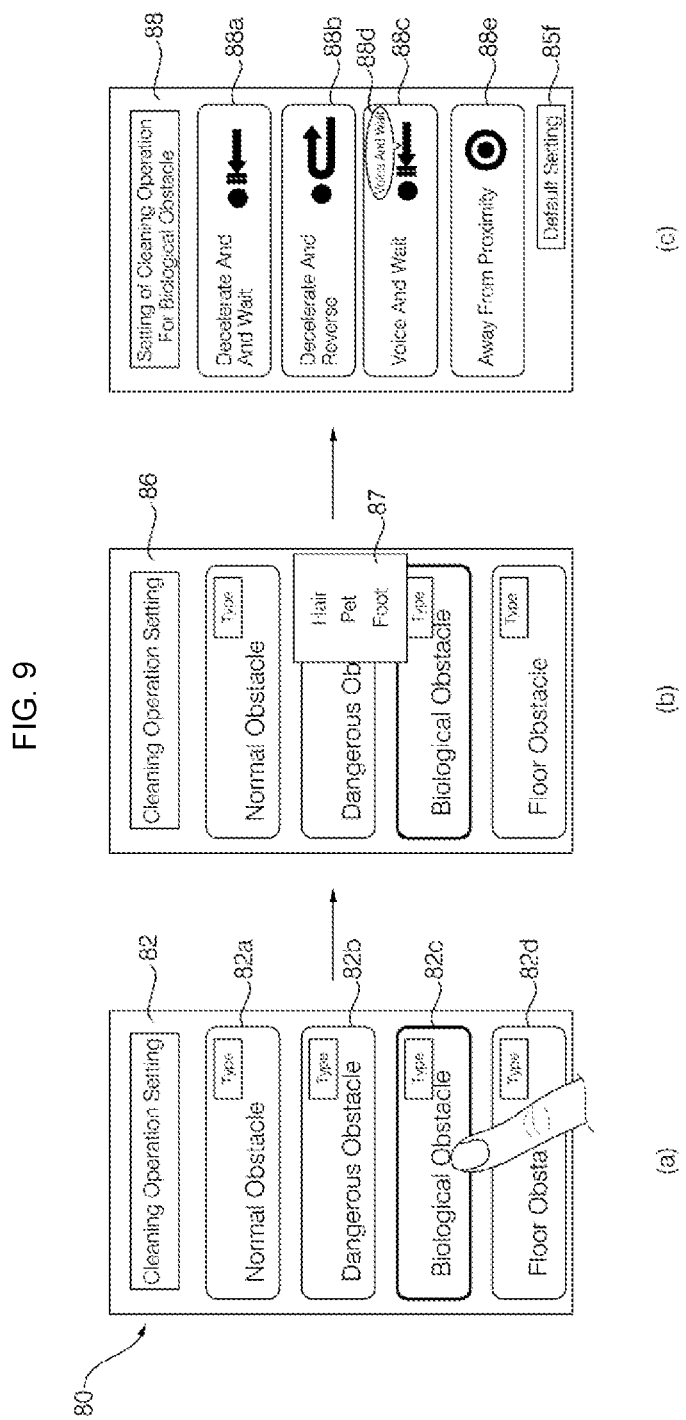
FIG. 9 is a diagram illustrating a control screen for setting a mobile robot's operation responsive to a biological obstacle according to an embodiment of the present invention.

When at least one of multiple obstacles displayed on a control screen is selected, the terminal 80 outputs a control screen including a motion setting menu to set a motion responsive to the selected obstacle, as shown in FIG. 8 or 9.

When a pet, a door threshold, a shoe, and a vase are selected from among multiple obstacles, the terminal 80 sets motions responsive to the pet, the door threshold, the shoe, and the vase, respectively, and then transmits obstacle setting data to the mobile robot 100 together with a cleaning command.

The terminal 80 may update an obstacle list of the control screen based on data received from the server 90.

The server 90 may set an obstacle frequently sensed by the mobile robot 100 from among multiple obstacles during cleaning, and transmit information thereof to the terminal. Accordingly, the terminal 80 outputs a control screen so as to set an obstacle present in the area, as shown in the drawing.

In addition, through menu setting, the mobile robot 80 may change a type of an obstacle to be displayed on the control screen and the number of obstacles to be displayed thereon.

In this case, the server 90 collects an obstacle's information collected from the mobile robot, the obstacle's type set through the terminal, and data on setting of a motion responsive to the obstacle to thereby calculate statistics on the collected information and data, and updates obstacle recognition data and motion information responsive to the obstacle based on the frequency of sensing of the obstacle and the frequency of setting of each motion responsive to the obstacle.

FIG. 8 is a diagram illustrating a control screen for setting a mobile robot's operation responsive to a dangerous obstacle according to an embodiment of the present invention, and FIG. 9 is a diagram illustrating a control screen for setting a mobile robot's operation responsive to a biological obstacle according to an embodiment of the present invention.

If an obstacle present in a travel area to be cleaned is selected through an obstacle selection menu on the control screen described with reference to FIG. 7, the terminal 80 outputs a control screen 82 including a motion setting menu for setting a motion responsive to a corresponding obstacle, as shown in FIG. 8 or 9.

The terminal 80 categorizes and displays a type of at least one obstacle selected from a motion setting menu displayed on the control screen, as shown in FIG. 8(*a*) and FIG. 9(*a*), as a normal obstacle 82*a*, a dangerous obstacle 82*b*, a biological obstacle 82*c*, and a floor obstacle 82*d*.

A Type key is displayed in each category, and, when the Type key is selected, a list 84 of obstacles included in a corresponding category is displayed on a control screen 83, as shown in FIG. 8(*b*).

The dangerous obstacle 82*b* may include a vase, a multiplug, and an electrical wire. In this case, when it comes to classifying obstacles by type, a list of obstacles may be changed through setting, and the terminal may transmit data of obstacle category change to the server 90.

When the dangerous obstacle 82*b* is selected, the terminal 80 displays a motion setting screen 85 for setting a motion of the mobile robot 100 responsive to the dangerous obstacle, as shown in FIG. 8(*c*).

Through the motion setting screen 85, the terminal 80 may set a motion responsive to a dangerous obstacle as one of Decelerate And Avoid Aside 85*a*, Decelerate And Reverse 85*b*, Notify User 85*c*, and Away From Proximity 85*d*.

If any one motion is selected and then Default Setting 85*e* is selected, the terminal 80 sets a motion responsive to a dangerous obstacle and returns back to an initial screen for setting of cleaning.

In this case, if the Away From Proximity 85*d* is selected, the terminal 80 sets a motion of staying away from proximity to a dangerous obstacle such as a vase, a multiplug, and an electric wire.

For example, the vase may be damaged upon collision with the mobile robot, and power supply to the electric wire or the multiplug may be cut off upon disconnection of a connector, and therefore, the terminal 80 may set to stay away from proximity.

In addition, the terminal 80 may set an additional motion of the mobile robot as to whether to change a traveling direction without approaching within proximity or whether to reverse. If the additional motion is not set, the mobile robot may travel by changing a traveling direction in response to other obstacles in the surroundings.

In some cases, if any one obstacle is selected from an obstacle list, individual motions responsive to a vase, a multiplug, and an electric wire may be set. That is, the terminal 80 may set a motion responsive to one of entire dangerous obstacles or may set an individual motion responsive to each and every individual dangerous obstacle.

As illustrated in FIG. 9(*a*), the terminal 80 categorizes and displays at least one obstacle, which is selected from an obstacle menu displayed on a control screen, as a normal obstacle 82*a*, a dangerous obstacle 82*b*, a biological obstacle 82*c*, or a floor obstacle 82*d*.

If the biological obstacle 82*c* is selected and a Type key thereof is selected, a list 97 of obstacles included in the biological obstacle, as shown in FIG. 9(*b*), is displayed on a screen 86. For example, the biological obstacle may include a hair, a pet, and a foot.

In addition, if the biological obstacle 82*c* is selected, a motion setting screen 88 for setting a motion of the mobile robot 100 responsive to the biological obstacle is displayed, as shown in FIG. 9(*c*).

Through the motion setting screen 88, a motion responsive to the biological obstacle may be set from among Decelerate And Wait 88*a*, Decelerate And Reverse 88*b*, Voice And Wait 88*c*, and Away From Proximity 88*d*.

If any one motion is selected and then Default Setting 85*f* is selected, a motion responsive to the biological obstacle is set and the screen returns back to an initial screen for setting of cleaning.

In this case, if the Voice And Wait 88*c* is selected, a motion responsive to a biological obstacle, such as a hair, a pet, and a foot, is set to wait for a predetermined time after outputting a predetermined voice. Voice data to be output as a voice guidance may be set any of voice guidance data pre-stored in the mobile robot 100, a music file selected by a user, or the user's recorded voice. The music file or the user's recorded voice may be transmitted to the mobile robot through the terminal or may be recorded and stored directly in the mobile robot by the user.

In addition, the terminal 80 may set individual motions responsive to a hair, a pet, and a foot which are biological obstacles. In some cases, a voice guidance may be changed by a user to a recorded file.

In addition, if a waiting motion is set, the terminal 80 may further set a waiting time and an operation after the waiting time. The operation after the waiting time may be set by selecting an additional motion.

When setting of an obstacle and a motion responsive to the obstacle is complete, the terminal 80 transmits cleaning setting data to the mobile robot 100 together with a cleaning command and the mobile robot starts to clean a set travel area.

Figure 10:
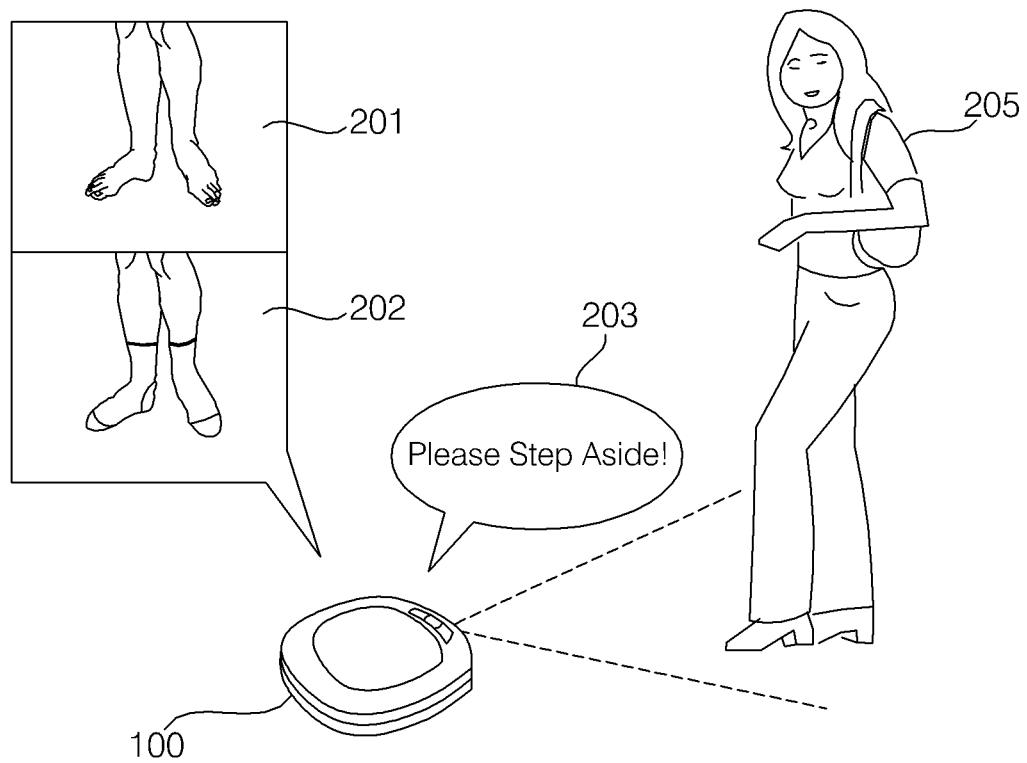
FIG. 10 is an example referred to in the description of obstacle recognition by a mobile robot and an operation dependent thereon according to an embodiment of the present invention.

FIG. 10 is an example referred to in the description of obstacle recognition by a mobile robot and an operation dependent thereon according to an embodiment of the present invention.

As illustrated in FIG. 10, if a person is located in a traveling direction while the mobile robot 100 performs cleaning, the mobile robot 100 senses an obstacle 205 and captures an image.

The obstacle recognizer 112 analyzes the captured image to thereby determine a shape of the obstacle, compare the shape of the obstacle with obstacle recognition data 201 and 202, and recognize the obstacle as a human foot.

Since the human foot is a biological obstacle, the motion controller 111 operates in accordance with motion setting responsive to the biological obstacle. In addition, if an individual motion responsive to the human foot among biological obstacles is set, the motion controller 111 operates in accordance with the set individual motion.

For example, if the motion responsive to the human foot is set to Voice And Wait, a voice guidance "Please Step Aside" is output through the speaker 173, as shown in the drawing, and wait for a predetermined time. The voice guidance may be replaced with a user's recorded voice, a predetermined music file, or a sound effect.

Figure 11:
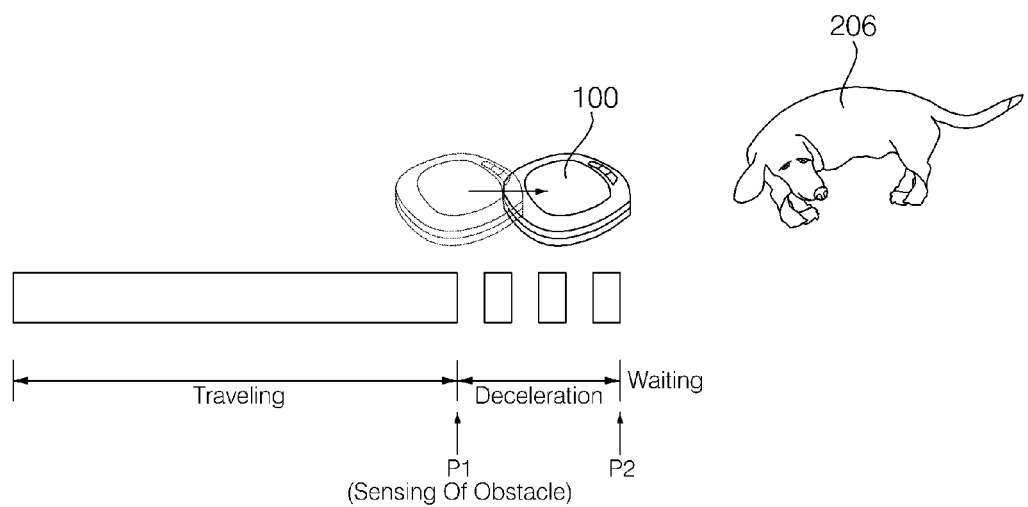
FIG. 11 is an exemplary diagram referred to in the description of recognition of a biological obstacle by a mobile robot and an operation dependent thereon according to an embodiment of the present invention.

FIG. 11 is an exemplary diagram referred to in the description of recognition of a biological obstacle by a mobile robot and an operation dependent thereon according to an embodiment of the present invention.

As illustrated in FIG. 11, if an obstacle 206 present in a traveling direction is sensed by the sensor unit 122 during traveling, the mobile robot 100 photographs the obstacle 206 through the camera 121.

The obstacle recognizer 112 analyzes photographed image data to thereby recognizes an obstacle according to a shape of the obstacle and determine a type of the obstacle. In some cases, an obstacle may be recognized based on a motion of the obstacle.

If the obstacle 206 is recognized as a pet, the motion controller 111 performs a motion, which is set at a first time point P1 when the obstacle is sensed and recognized, according to motion setting for the biological obstacle.

For example, if a motion responsive to the biological obstacle is Decelerate And Wait, the mobile robot decelerates at the first time point P1 and stops at a second time point P2 and then wait.

A biological obstacle such as a person and a pet moves when finding the mobile robot, and thus, the mobile robot may wait for a while and then travel again when the obstacle moves.

If the obstacle does not move even after a predetermined waiting time, another motion may be performed.

Figure 12:
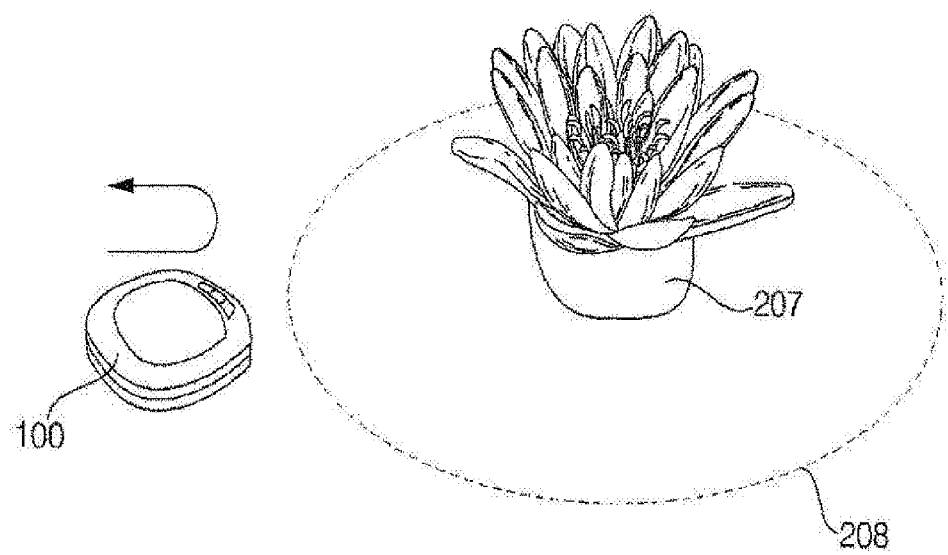
FIG. 12 is an exemplary diagram referred to in the description of recognition of a dangerous obstacle by a mobile robot and an operation dependent thereon according to an embodiment of the present invention.

FIG. 12 is an exemplary diagram referred to in the description of recognition of a dangerous obstacle by a mobile robot and an operation dependent thereon according to an embodiment of the present invention.

As illustrated in FIG. 12, the mobile robot 100 senses a vase, which is a dangerous obstacle, and thereby recognizes the vase.

If a motion responsive to the vase 207 is Away From Proximity, the mobile robot 100 may no longer approach the vase at a predetermined distance 208 or further, and then travel by changing a traveling direction.

Thus, as the mobile robot 100 recognizes a sensed obstacle and set a different motion according to each type of the obstacle, the mobile robot is able to operate in response to various obstacles and perform cleaning effectively without causing damage to the obstacles and the mobile robot.

The above description is merely exemplary, and those skilled in the art will appreciate that various modifications and variations are possible, without departing from the characteristics thereof.

The invention claimed is:

1. A moving robot comprising:
a sensor unit configured to sense an object present in a traveling direction;
a camera configured to, in response to sensing of the obstacle by the sensor unit, photograph the obstacle;
a data unit configured to store information regarding a plurality of obstacles;
a controller configured to control an operation by recognizing the obstacle based on the information stored in the data unit;
a travel unit configured to move a main body of the moving robot while performing a designated operation according to a control command from the controller; and
a speaker configured to output a designated sound according to a control command from the controller,
wherein the controller comprises:
an obstacle recognizer configured to analyze an image of the obstacle photographed by the camera, compare the image of the obstacle with the information stored in the data unit, recognize the obstacle, and determine a type of the obstacle; and
a motion controller configured to, in response to the type of the obstacle recognized by the obstacle recognizer, perform a designated operation according to a setting stored in the data unit,
wherein
the controller designates and stores a basic motion corresponding to the type of the obstacle, and resets the basic motion according to the setting, and
with respect to the obstacle or the type of the obstacle to which a motion is not specified, the controller operates according to the basic motion, and when a new motion for the obstacle is set, the controller operates according to the new motion corresponding to the type of the obstacle.

2. The mobile robot of claim 1, wherein the obstacle recognizer is configured to analyze the image of the obstacle, determine a shape of the obstacle, compare the shape of the obstacle with pre-stored obstacle recognition data, recognize the shape of the obstacle, and determine the type of the obstacle.

3. The mobile robot of claim 1, wherein the obstacle recognizer is configured to recognize the obstacle based on the image of the obstacle and a position and a motion of the obstacle sensed by the sensor unit.

4. The mobile robot of claim 1, wherein the motion controller is configured to, based on information on a motion set according to the type of the obstacle, perform a distinct operation according to the type of the recognized obstacle.

5. The mobile robot of claim 1, wherein the obstacle recognizer is configured to determine the type of the obstacle by categorizing the obstacle as a normal obstacle, a dangerous obstacle, a biological obstacle, or a floor obstacle.

6. The mobile robot of claim 1, wherein the motion controller is configured to control an operation according to a motion set responsive to the type of the obstacle and an individual motion set responsive to an individual obstacle included in the type of the obstacle.

7. The mobile robot of claim 1, wherein the motion controller is configured to, in response to the obstacle, perform a motion that constitutes a combination of at least one operation from among stopping, decelerating, accelerating, reversing, waiting, changing a traveling direction, and staying away from proximity.

8. The mobile robot of claim 1, wherein the motion controller is configured to, in response to the obstacle, output any one of a sound effect, an alert sound, and a voice guidance through the speaker.

9. The mobile robot of claim 1, wherein the data unit is configured to store obstacle recognition data for analyzing the image of the obstacle and recognizing the obstacle, motion data on a motion to be performed according to the type of the obstacle, and change data including changed information regarding the obstacle or the motion.

10. The mobile robot of claim 1, further comprising a communication unit configured to communicate with a terminal or a server.

11. The mobile robot of claim 10,
wherein the controller is configured to receive, from the terminal, information on an obstacle present in a travel area to be cleaned and motion information responsive to the obstacle, and store the received information,
wherein the obstacle recognizer is configured to, based on the stored information on the obstacle present in the travel area, recognize a sensed obstacle, and
wherein the motion controller is configured to control an operation according to the motion information that is set responsive to the obstacle.

12. The mobile robot of claim 10, wherein the controller is configured to, when no motion responsive to the recognized obstacle is set or when a new obstacle is sensed, request motion setting to the terminal.

13. The mobile robot of claim 10, wherein the controller is configured to, when the obstacle is unrecognizable or when a new obstacle is sensed, transmit obstacle information including the image of the obstacle to an external server, store obstacle data received from the server in the data unit, and re-recognize the obstacle.

14. A mobile robot system comprising:
a mobile robot configured to, in response to traveling in a set travel area, perform cleaning and perform a motion that is set responsive to a sensed obstacle;

a terminal configured to transmit a cleaning command to the mobile robot and transmit information on the obstacle present in the travel area together with the cleaning command; and a server configured to collect and analyze information on the obstacle sensed by the mobile robot and generate obstacle recognition data including feature information for recognizing the obstacle, and motion information responsive to the obstacle, wherein the mobile robot designates and stores a basic motion corresponding to a type of the obstacle, and resets the basic motion according to a setting, and with respect to the obstacle or the type of the obstacle to which a motion is not specified, the mobile robot operates according to the basic motion, and when a new motion for the obstacle is set, the mobile robot operates according to the new motion corresponding to the type of the obstacle.

15. The mobile robot system of claim 14, wherein the terminal is configured to set any one motion responsive to the obstacle present in the travel area from among the motion information set by the server, and transmit the set motion to the mobile robot.

16. The mobile robot system of claim 15, wherein the terminal is further configured to categorize the obstacle present in the travel area by type and set a motion responsive to the type of the obstacle or an individual obstacle included in the type of the obstacle.

17. The mobile robot system of claim 15, wherein the terminal is further configured to set the mobile robot to, in response to the obstacle, perform a motion that constitutes a combination of at least one operation from among stopping, decelerating, accelerating, reversing, waiting, changing a traveling direction, and staying away from proximity.

18. The mobile robot system of claim 15, wherein the terminal is configured to set the motion to, in response to the obstacle, output any one of a sound effect, an alert sound, and a voice guidance.

19. The mobile robot of claim 15, wherein the controller is configured to, when a control screen including an obstacle selection menu for setting an obstacle present in the travel area is displayed and any one obstacle is selected through the obstacle selection menu, display a control screen including a motion setting menu for categorizing the obstacle and setting a motion.

20. The mobile robot system of claim 19, wherein the terminal is configured to:

based on data received from the server, update obstacle categories, an obstacle list, and motion information on the control screen; and through menu setting, change a type of the obstacle to be displayed on the control screen and a number of obstacles to be displayed.

21. The mobile robot of claim 14, wherein the terminal is configured to, while the mobile performs the set motion, set the new motion responsive to the obstacle and transmit change data to the mobile robot, and wherein the mobile robot is configured to re-set a motion responsive to the obstacle based on the change data.

22. The mobile robot system of claim 14, wherein the server is configured to collect collected information on the obstacle and data on the type of the obstacle set by the terminal and motion setting for the obstacle, calculate statistics, and update the obstacle recognition data and the motion information responsive to the obstacle according to frequency of sensing of the obstacle and frequency of motion setting for the obstacle.

23. The mobile robot system of claim 14, wherein the server is configured to, when obstacle information on an unrecognizable obstacle or a new obstacle is received from the mobile robot, analyze the obstacle information, recognize the obstacle, and generate obstacle recognition data for the new obstacle and motion information responsive for the obstacle.

24. A method of controlling a mobile robot, the method comprising:

while performing cleaning by traveling in a designated travel area, sensing an obstacle;

capturing an image of the obstacle;

analyzing the image of the obstacle and recognizing a type of the obstacle;

in response to the obstacle, operating according to a designated motion;

performing a motion with respect to a preset type of the obstacle when a motion corresponding to the obstacle is not set;

setting a basic motion when no motion is set for the obstacle or the type of the obstacle;

in response to performing the basic motion, performing at least one of executing an operation or outputting a predetermined sound;

setting a new motion for the obstacle; and when the obstacle is detected, operating according to the new motion.

25. The method of claim 24, wherein the motion constituting a combination of at least one operation from among stopping, decelerating, accelerating, reversing, waiting, changing a traveling direction, and staying away from proximity is performed responsive to the obstacle.

26. The method of claim 24, wherein any one sound among a sound effect, an alert sound, and a voice guidance is output responsive to the obstacle.

27. The method of claim 24, further comprising, when no motion responsive to the obstacle is set, requesting motion setting to the terminal.

28. The method of claim 24, further comprising:

before the performing of the cleaning, receiving a cleaning command for the travel area and data on an obstacle present in the travel area from the terminal; and based on the data, setting a motion responsive to the obstacle present in the travel area.

29. The method of claim 24, further comprising, when the obstacle is unrecognizable or when a new obstacle is sensed, transmitting information a sensed obstacle to the server.

* * * * *